United States Patent
Cunningham

(10) Patent No.: US 6,280,200 B1
(45) Date of Patent: Aug. 28, 2001

(54) NON-JULIAN CALENDAR FOR AIDING A CHILD IN DETERMINING DAILY INTERVALS PRECEDING A DATE OF SIGNIFICANCE

(76) Inventor: Laura Jo E. Cunningham, 63 Main St., Raymond, ME (US) 04071

( * ) Notice: Subject to any disclaimer, the term of this patent is extended or adjusted under 35 U.S.C. 154(b) by 0 days.

(21) Appl. No.: 09/386,102

(22) Filed: Aug. 30, 1999

(51) Int. Cl.⁷ .................................................. G09B 19/12
(52) U.S. Cl. ................................................. 434/304; 283/2
(58) Field of Search ..................................... 434/304, 236, 434/237, 238; 283/2; 40/107; 273/155

(56) References Cited

U.S. PATENT DOCUMENTS

| | | |
|---|---|---|
| 2,582,355 | 1/1952 | Ratner . |
| 2,831,278 | 4/1958 | Myers . |
| 3,035,355 * | 5/1962 | Holmes ................................ 434/238 |
| 3,290,812 | 12/1966 | Hunkins . |
| 4,776,799 * | 10/1988 | Walsh ................................... 434/238 |
| 4,863,386 * | 9/1989 | Maxey ................................. 434/304 |
| 5,058,296 * | 10/1991 | Notzel ................................... 40/107 |
| 5,090,733 | 2/1992 | Bussiere . |
| 5,135,260 | 8/1992 | Irlik et al. . |
| 5,207,580 | 5/1993 | Strecher . |
| 5,257,940 * | 11/1993 | Schaarschmidt ...................... 434/304 |
| 5,372,509 * | 12/1994 | Brocato ................................ 434/238 |
| 5,431,450 * | 7/1995 | Coleman ................................ 283/62 |
| 5,443,288 * | 8/1995 | Miles ....................................... 283/2 |
| 5,725,381 * | 3/1998 | Kollath ................................. 434/238 |
| 5,810,395 * | 9/1998 | Morgan ................................. 283/70 |
| 5,934,707 * | 8/1999 | Johnson .................................. 283/2 |

FOREIGN PATENT DOCUMENTS

| | | | |
|---|---|---|---|
| 2139494 * | 11/1984 | (GB) | .................................. 434/304 |

* cited by examiner

Primary Examiner—Jacob K. Ackun, Jr.
Assistant Examiner—Kurt Fernstrom
(74) Attorney, Agent, or Firm—Farrell & Associates, P.C.; Kevin M. Farrell; Shayne Y. Huff

(57) ABSTRACT

Disclosed are embodiments of a non-Julian calendar for informing a child in determining daily intervals preceding a date of significance. A preferred multilayer embodiment comprises a lower layer having a first top surface; an upper layer disposed above said lower layer and having a second top surface; a plurality of polygonal tabs formed in said upper layer, said tabs having a front surface and a back surface, said tabs being movable from a closed to an open position; a printed artistic design or image disposed on said second top surface; a plurality of printed unique designators disposed on said second top surface, one unique designator being located on the front surface of each tab, the printed unique designators functioning to define the order in which the tabs are to be opened; and a plurality of printed message/activity areas, one printed message/activity area being revealed by the movement of a tab from a closed position to an open position.

1 Claim, 4 Drawing Sheets

NON-JULIAN CALENDAR FOR AIDING A CHILD IN DETERMINING DAILY INTERVALS PRECEDING A DATE OF SIGNIFICANCE

BACKGROUND OF THE INVENTION

There are numerous prior art devices and methods for aiding a person in keeping track of time. Calendars used simply for keeping track of the passage of time have been known for millennia. Other calendar designs have incorporated figures or messages for aesthetic enhancement of the calendar. Many previous calendars have been designed which provide humorous, religious, or inspirational messages for a user associated with each day. For example, Christmas Advent calendars provide religious inspiration through messages and figures relating to the biblical teachings of the Christmas season.

U.S. Pat. No. 2,831,278, issued to R. H. Myers, on Apr. 22, 1958, presents a calendar structure, which permits a user to write personal reminder messages under a moveable tab covering each date on the monthly calendar. U.S. Pat. No. 5,207,580, issued to Victor J. Strecher, on May 4, 1993, presents a calendar manufactured with customized textual messages relating to a specific health or behavior modification goal for a particular person. Motivational messages as well as reminder messages are displayed in appropriate days of each related month. Specific days, months, and messages are unique to the particular peoples' behavior modification or health-related goal. U.S. Pat. No. 5,090,733, issued to R. Bussier, on Feb. 25, 1992, presents a calendar with inspirational and motivational messages indicating thoughts or actions for each day, the goal being inspiration for self-improvement. The messages are printed on moveable tabs, relating to sections of a picture so that as messages are added or revealed, a picture is being constructed to inspire the user to fulfill a personal goal. These past inventions are not associated with the timing of any specific event comprising part of a time interval but rather relate to abstractions, such as personal reminders, inspiration, or motivation. The time periods associated with these inventions are arbitrary in that they are not related to the timing of any particular event or interval. Therefore, a need was established for a calendar, which was useful to inform a user as to the progress of timing and development of a specific time constrained event or interval.

A first attempt at meeting this need was U.S. Pat. No. 5,443,288, issued to Barbara L. Miles, on Aug. 22, 1995, which is an advent calendar for educating an expectant mother as to the fetal development process and the associated milestones or the human gestation period. Unlike the present invention, the Miles device specifically informs a user regarding fetal development during a plurality of weeks of the human gestation period, and is not applicable to the instruction of children, whereas the present invention is specifically tailored to aiding a child in determining time intervals preceding a date of significance. Not only do the purpose and look of the present invention differ from the Miles device, but also the method of informing the user, the comprehension level of calendar information, and the arrangement of calendar elements and graphics. None of the above noted patents, taken either singly or in combination, are seen to disclose the specific arrangement of concepts disclosed by the present invention. Therefore, a need has been established for a calendar specifically tailored for instruction of a child that aids the child in determining time intervals preceding a date of significance, such as the number of days before a birthday.

SUMMARY OF THE INVENTION

The present invention relates to multiple embodiments of a non-Julian calendar for informing a child in determining daily intervals preceding a date of significance. The general concepts which relate to intervals of time are difficult for children to fully comprehend. When a young child is informed that some date of significance is, for example, 10 days away, they are unable to fully comprehend and adjust emotionally. When dealing with an event such as a birthday, this is a seemingly non-important issue (when viewed from the eyes of an adult). However, when considering a perhaps more significant event, such as upcoming surgery, for example, even we as adults can understand the importance of attempting to take control of our emotions. This imparts a sense of security to the child.

The Julian calendar was introduced in Rome in 46 B.C. and established the 12 month year of 365 days with each fourth year having 366 days and the months each having 31 or 30 days, except for February 28 or in leap years 29 days. The present invention relates to a non-Julian calendar for informing a child in determining daily intervals preceding a date of significance. All embodiments of the non-Julian calendar of the present invention contain a plurality of movable (or removable), each bearing a unique designator (integer numbers, in preferred embodiments) defining the order in which the tabs are to be open (or removed). The number of tabs is preferably between 6 and 20, although this range is not meant to be limiting.

For purposes of introduction, a brief example will be provided. All aspects of this example will be expanded upon elsewhere in the Specification. This brief example is intended only to communicate the concept of the invention. Consider an example in which an embodiment of the non-Julian calendar of the present invention contains 10 movable tabs. Beginning 10 days before a date of significance, such as a birthday, a child opens a single tab to reveal an activity. On consecutive days, the child opens the tabs in a step-wise manner and performs a specified activity. In the process of engaging in the activities specified, which include opening a single tab per day, even a young child can learn to understand the concept of a daily interval. The assimilation of this concept enables the child to present an appropriate emotional response.

In a preferred embodiment, the non-Julian calendar of the present invention is a multi-layer calendar which comprises a lower layer having a first top surface and an upper layer disposed above the lower layer and having a second top surface. The term "layer" as used herein, is meant to encompass laminates of individual sheets. The materials from which these layers are made may be any thin a flexible stock. Paper is the preferred material, however plastics and other sheet stocks may be employed.

The upper layer contains a plurality of tabs, the tabs having a front surface and a back surface. The tabs are movable from a closed to an open position much like a door, along a fixed linear fold axis. In preferred embodiments, the tabs are polygonal in shape, although any geometric shape which folds open about a fixed linear fold axis is meant to be encompassed within the scope of the present invention.

A printed artistic design or image is disposed on the second top surface. This artistic design or image may be selected to relate to the date of significance. For example, if the date of significance is a birthday, the artistic design or image may be a birthday motif including, for example, party hats and party favors. In preferred embodiments, significant elements of the artistic design or image are positioned on the second top surface at locations corresponding to the tabs.

A plurality of printed unique are designators disposed on the second top surface. One unique designator is positioned on the front surface of each tab. The printed unique designators function to define the order in which the tabs are to be opened in use. In preferred embodiments, the unique designators are numeric integers. In alternative embodiments, letters of the alphabet may be used. It is important that whatever the choice of unique designators, an order is implied.

The calendar of the present invention also includes a plurality of printed message/activity areas, one printed message/activity area being revealed by the movement of a tab from a closed position to an open position. The term "message/activity area", as used herein, is meant to include a wide variety of printed indicia. For example, it may correspond to a blank space in which a picture is to be drawn, a word or sentence is to be written, a sticker is to be applied, etc. It may also include simple written messages or pictures.

In a preferred embodiment, the message/activity area revealed when a tab is opened is located on the first top surface. Alternatively, the message/activity area revealed when a tab is opened is located on the back surface of the tab which is opened. In other embodiments of the present invention, two message/activity areas are revealed when a tab is opened, a first message/activity area being located on the first top surface and a second message/activity area being located on the back surface of the tab which is opened. A message/activity area may also be located on the front surface of each tab.

In use, a child is provided with a calendar as described above. The child is then instructed to open a first tab, the order of the tabs to be opened being predetermined by the unique designators printed on each tab. The content of the message/activity area is absorbed by the child (with assistance, as necessary) and optional associated activities performed. To determine the number of days preceding the date of significance, the child counts (with assistance, as necessary) the number of tabs positioned in a closed position, and relates the number determined to the number of days preceding said date of significance.

The "relating" referred to in the preceding sentence may be accomplished in a number of ways. For example, a child may be instructed to open numbered tabs in ascending order. The number of days preceding the date of significance is then determined by counting the number of unopened tabs, the number of unopened tabs being equivalent to the number of days preceding the date of significance.

Alternatively, the child. may be instructed to open numbered tabs in descending order. When numbered tabs are opened in descending order, the number of days preceding the date of significance is determined by simply referring to the unique designator (in this case, a numeric integer) which is next in order to be opened.

In an alternative embodiment to that described above, the tabs which are movable between an open and closed position in the preferred embodiment may be removed. Perforation along a linear fold axis facilitates removal of a tab in this embodiment. In removable tab embodiments, the message/ activity area is preferably located on the first top surface.

In the removable tab embodiment, the number of days preceding the date of significance is determined by allowing or enabling the child to count the number of tabs remaining, and relating the number determined to the number of days in a manner analogous to that discussed above in connection with the movable tab embodiments.

The present invention also relates to a single-layer embodiment. The single-layer embodiment of the invention includes a single layer having a top surface. A plurality of tabs of the type described above are formed in the single layer, the tabs being movable from a closed to an open position. A printed artistic design or image is disposed on said top surface and a plurality of printed unique designators are disposed on said top surface. As in other embodiments, one unique designator is located on the front surface of each tab, the printed unique designators functioning to define the order in which the tabs are to be opened. A plurality of printed message/activity areas are provided, one printed message/activity area being revealed by the movement of a tab from a closed position to an open position. In preferred embodiments, the printed message/activity areas revealed when a tab is opened are located on the back side of each polygonal tab. The use of the single-layer embodiment to aid a child in determining the number of days preceding a date of significance is completely analogous to the methods described above in connection with other embodiments of the invention.

The single-layer embodiment of this invention is well-suited for use as a box top. In this embodiment, opening a tab may reveal a treat or party favor contained within the box.

DETAILED DESCRIPTION OF PREFERRED EMBODIMENTS

Figure 1:
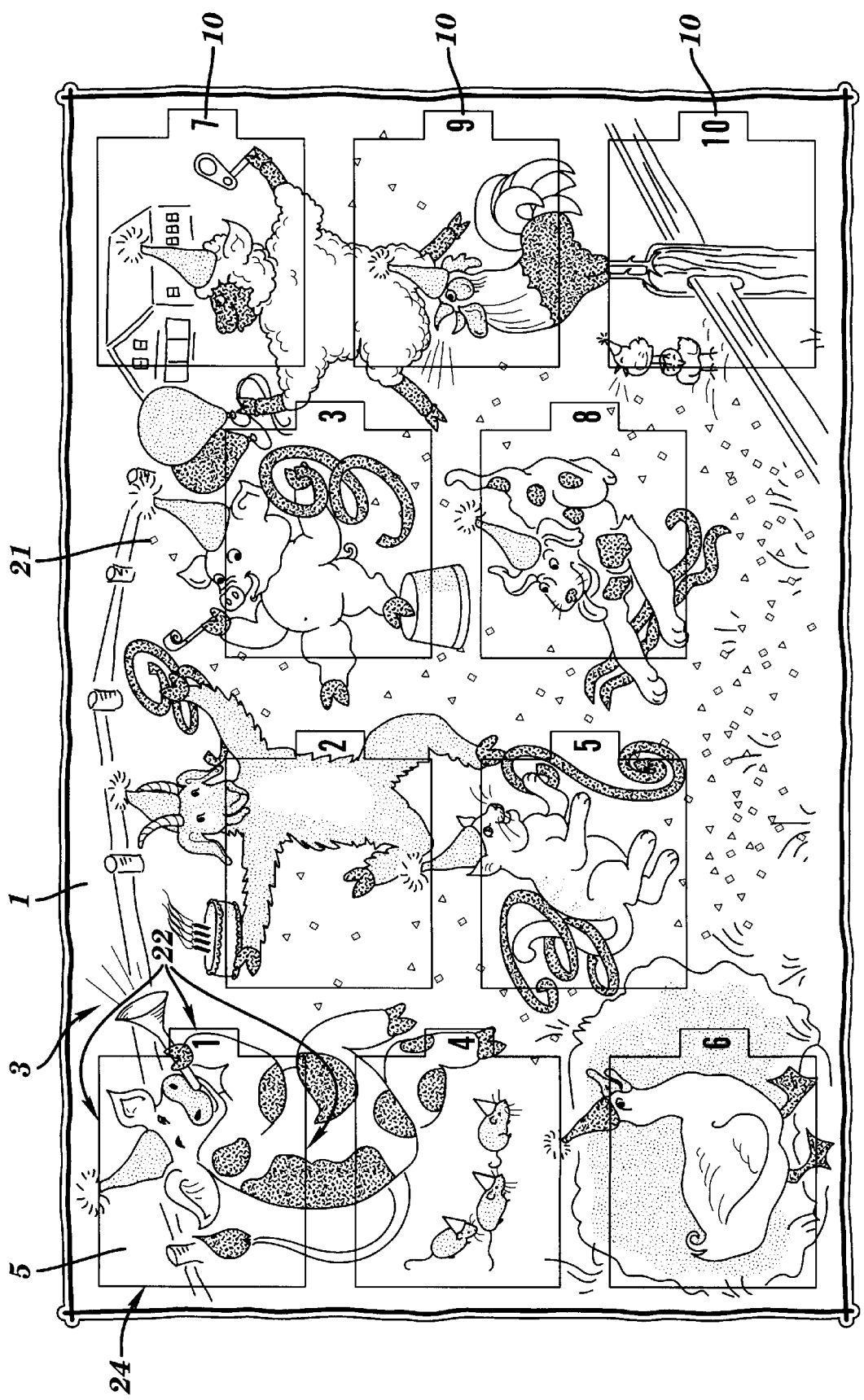
FIG. 1 is a front view, illustrating a non-Julian calendar for aiding a child in determining daily intervals preceding a date of significance, wherein a plurality of tabs are shown in a closed position.
Figure 2:
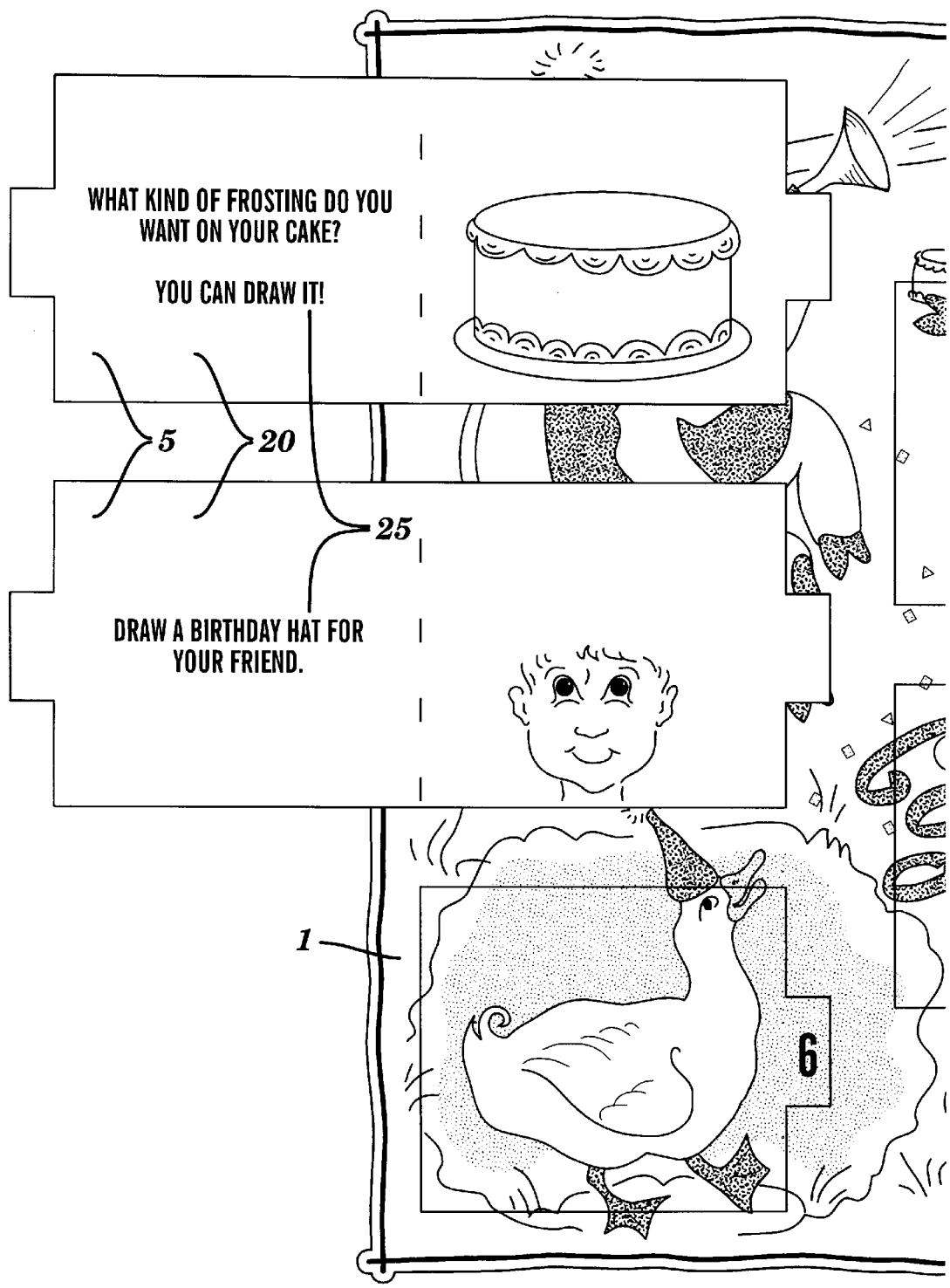
FIG. 2 is a front view, illustrating a non-Julian calendar for aiding a child in determining daily intervals preceding a date of significance, wherein a plurality of tabs are shown in an open position.
Figure 3:
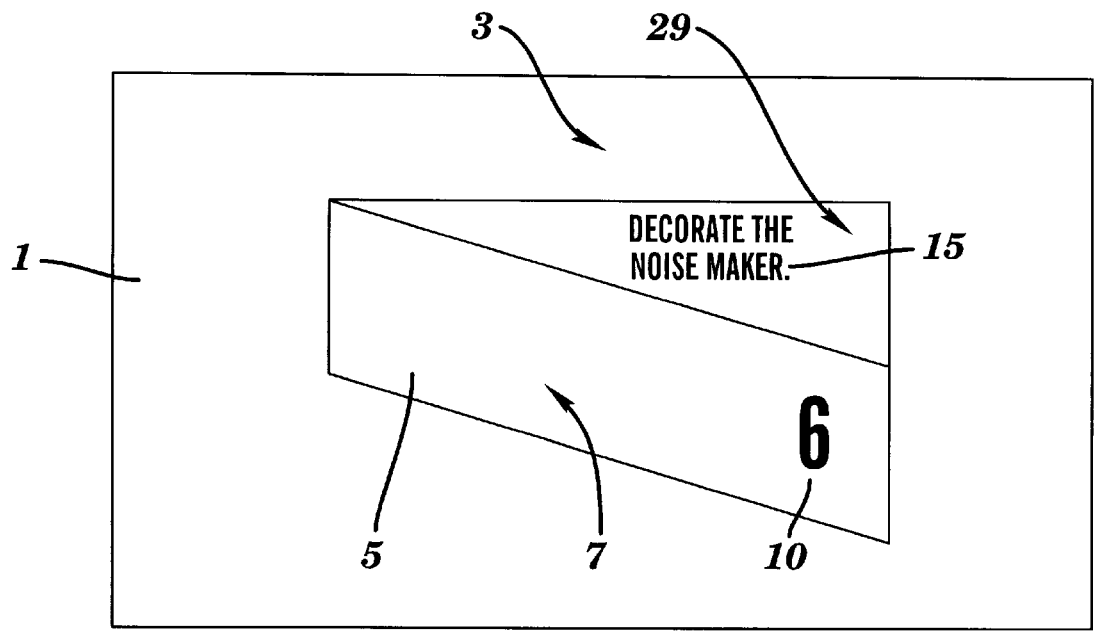
FIG. 3 is a front view, illustrating one exemplary tab embodiment of the non-Julian calendar of FIG. 1, and indicating the manner in which the polygonal tab may be opened.

Multiple embodiments of a practical non-Julian calendar for aiding a child in determining daily intervals preceding a date of significance, constructed in accordance with the present invention, are indicated generally at (1) in FIGS. 1–6. Turning to FIG. 1, a front view of an embodiment of the non-Julian calendar (1) of the present invention. Second layer (3) shows image (21) as a birthday motif. This is just one exemplary image and it is known in the art that a plethora of images depicting any date of significance may be applied to the front surface (7) of second layer (3). Second layer (3) is attached to a first layer (29), as shown in FIG. 3 to stiffen the structure of non-Julian calendar (1). Polygonal tabs (5), as shown in FIG.1, are formed in the second layer (3) of non-Julian calendar (1) preferably by die-cutting on three sides (22) of each polygonal tab (5). A fourth side (24) remains uncut to serve as a hinge upon which a user may bend and fold open each polygonal tab to expose the back surface (20), as shown in FIG. 2, of the polygonal tab (5).

It should be noted that the polygonal tabs (5) are shown in rectangular configurations, but it is known in the art that any tab configuration may be formed that retains a portion strong enough to function as a reusable hinge and enables a user to move the polygonal tab (5) between closed and open positions, best shown in FIG. 3. Indicia (10) applied to the polygonal tabs (5), as shown in FIG. 1, serve to indicate the number of days preceding a date of significance, such as a birthday. Although this preferred embodiment shows indicia (10) as numbers indicating a number of days before a birthday, the indicia could be a number of weeks, months, or any time increment preceding any date of significance. Alternatively, indicia (10) may be letters or any suitable identification capable of distinguishing each polygonal tab. The first and second layers (29 and 3) are preferably manufactured from paper, but may be formed from any suitable material with sufficient flexibility to allow the polygonal tabs to be opened and closed multiple times by a user. Indicia (10) and image (21) may be printed, painted, burned on by means of a laser, or applied by any suitable method known in the art. In the preferred embodiment, indicia (10) are numbers relating to the number of days preceding a date of significance. For example, a "5" printed on a polygonal tab indicates that the tab relates to the day that is five days before the date of significance. This allows the child to count down to the date of significance and learn how to determine the number of days preceding the date of significance. Alternatively, indicia (10) may be letters, such as "a" to indicate a specific polygonal tab to open on a predetermined day preceding the date of significance. The child can learn how to determine the number of day preceding the date of significance by opening the polygonal tab with the "a" indicia and counting the number of polygonal tabs that are closed. This facilitates teaching of a child about daily intervals preceding a date of significance without requiring the child to know how to count down, in the case of a number indicia printed on the polygonal tab.

Turning to FIG. 2, the non-Julian calendar of FIG. 1 is shown with each polygonal tab (5) shown in an open position. Indicia (25) describing an activity to be performed by a child is shown on the back surface (20) of each polygonal tab (5). The indicia (25) is designed to allow a child to perform the activity and learn to associate the activity with the indicia (10) on the front surface (7) of the polygonal tab (5), thereby helping the child learn the number of days before a date of significance while being entertained by performing the activity. Indicia (25), like indicia (10) may be printed, painted, burned on by means of a laser, or applied by any suitable method known in the art.

Turning to FIG. 3, a first embodiment of the non-Julian calendar (1) of FIG. 1 is shown. FIG. 3 shows a first layer (29) with printed indicia (15) indicating an activity to be performed by a child on a predetermined day. The predetermined day precedes a date of significance, such as a birthday, and is indicated by indicia (10) on the top surface (7) of the second layer (3). A first embodiment of a polygonal tab (5) is shown with three sides (22) cut and a fourth side (24) acting as a hinge formed in the second layer (3) to form a front side (11) and a back side (26), shown in FIGS. 5 and 6. FIG. 3 indicates the manner in which the polygonal tab (5) may be opened to uncover the indicia (15) indicating the activity to be formed, which is applied to the first layer (29). Indicia (15), like indicia (10) may be printed, painted, burned on by means of a laser, or applied by any suitable method known in the art.

Figure 4:
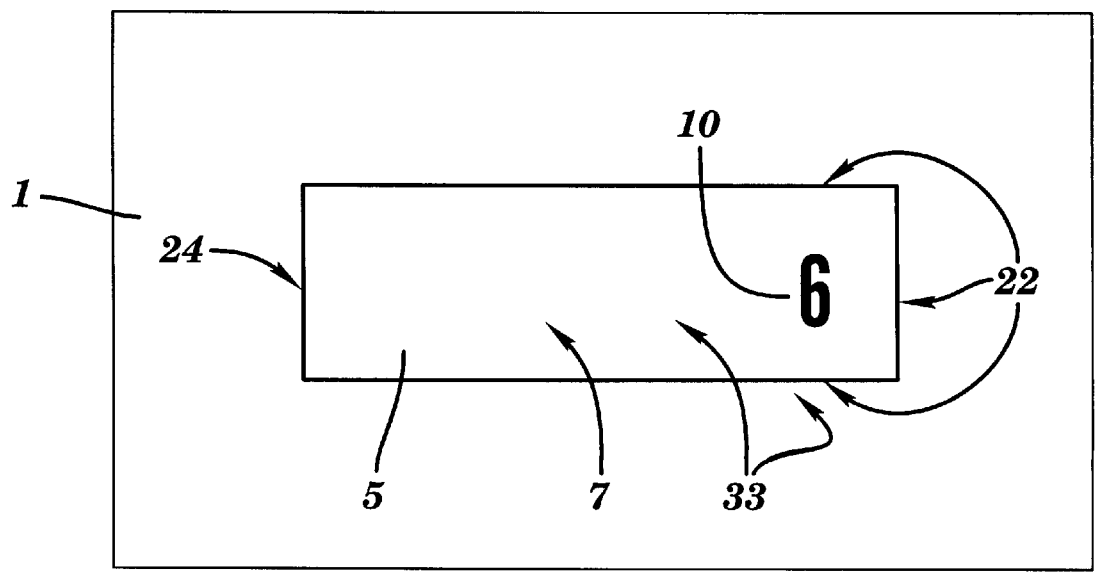
FIG. 4 is a front view, illustrating an exemplary polygonal tab embodiment of the non-Julian calendar of FIG. 1, wherein the polygonal tab is shown in a closed position and the top surface of the polygonal tab comprises indicia indicating a predetermined day preceding a date of significance.

Turning to FIG. 4, an embodiment of the non-Julian calendar (1) of FIG. 1 is shown with the polygonal tab (5) formed in a substrate material (33) by cutting three sides (22) on the polygonal tab (5) and leaving the fourth side (24) uncut to function as a hinge. In this embodiment, indicia (10), which is printed on top surface (7) on substrate material (33), indicates a specific number of days preceding a date of significance. An associated activity to be performed by a child on the specific day preceding a date of significance is printed on the back side (26), shown in FIG. 6, of polygonal tab (5). The substrate material (33) is preferably manufactured from paper, but may be formed from any suitable material with sufficient flexibility to allow the polygonal tabs to be opened and closed multiple times by a user.

Figure 5:
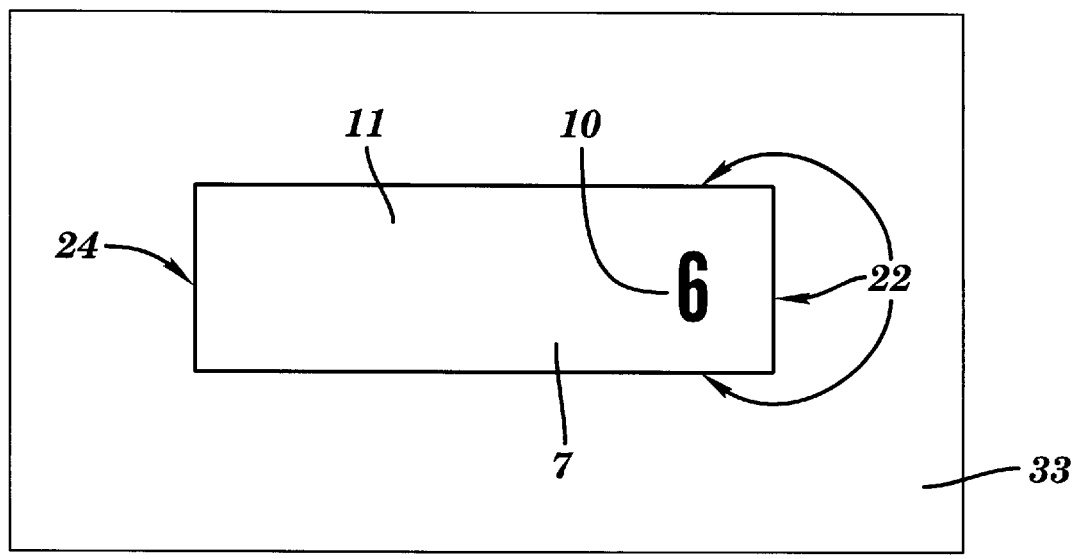
FIG. 5 is a front view, illustrating a second exemplary polygonal tab embodiment of the non-Julian calendar of FIG. 1, wherein the polygonal tab is shown in a closed position and the top surface of the polygonal tab comprises indicia indicating a predetermined day preceding a date of significance.

Turning to FIG. 5, a second embodiment of the non-Julian calendar (1) of FIG. 1 is shown with the polygonal tab (5) formed in a substrate material (33) by cutting three sides (22) on the polygonal tab (5) and leaving the fourth side (24) uncut to function as a hinge. In this embodiment, indicia (10), which is printed on top surface (7) on substrate material (33), indicates the number of days preceding a date of significance. The associated message regarding the predetermined day preceding the date of significance the back side (26), shown in FIG. 6, of polygonal tab (5).

Figure 6:
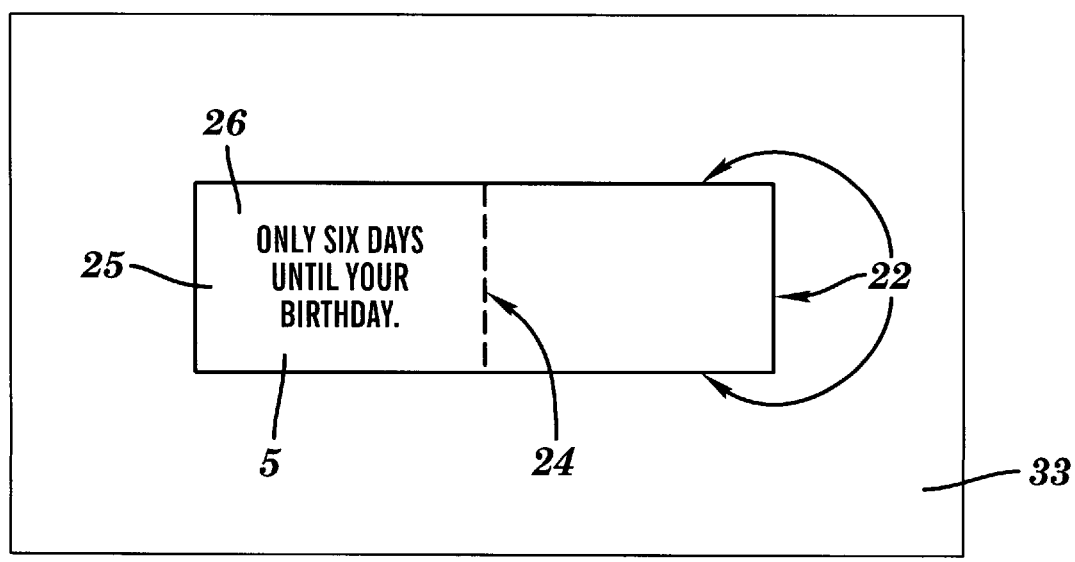
FIG. 6 is a front view, illustrating an exemplary polygonal tab embodiment of the non-Julian calendar of FIG. 1, wherein the polygonal tab is shown in an open position and the back surface of the polygonal tab comprises indicia providing a message regarding a predetermined day preceding a date of significance.

Turning to FIG. 6, the second embodiment of the non-Julian calendar of FIG. 1 is shown. A polygonal tab (5) is shown bent back about side (24) to an open position, exposing the back side (26) of polygonal tab (5). Indicia (25), applied to back surface (20), shows a message regarding the predetermined day preceding the date of significance. The polygonal tab (5) is shown to be formed by cutting along three sides (22) through substrate material (33).

Turning to FIGS. 1 and 2, an embodiment of a non-Julian calendar (1) is shown with multiple polygonal tabs (5) positioned randomly and with indicia (10), indicating the number of days preceding a date of significance in no particular chronological order. This random arrangement aids the child in learning how to look for a particular day preceding the date of significance and associate an activity with that day. This in turn helps the child to understand the duration of a specific time period before a date of significance. Exemplary activities to aid a child in determining daily intervals preceding a date of significance include: Coloring frosting on a picture of a black and white sketch of a birthday cake or drawing a birthday hat for a friend while illustrating a picture of a friend's head.

What is claimed is:

1. A non-Julian calendar for informing a child in determining daily intervals preceding a date of significance, comprising:

a) a lower layer having a first top surface;

b) an upper layer disposed above said lower layer and having a second top surface;

c) a plurality of polygonal tabs formed in said upper layer, said tabs having a front surface and a back surface, said tabs being movable from a closed to an open position;

d) a printed artistic design or image disposed on said second top surface;

e) a plurality of printed unique designators disposed on said second top surface, one unique designator being located on the front surface of each tab, the printed unique designators functioning to define the order in which the tabs are to be opened;

f) a plurality of printed activity instructions, one printed activity instruction being revealed by the movement of a tab from a closed position to an open position; and g) a plurality of activity areas in which to complete the activity instruction of step f), one activity area being revealed by the movement of a tab from a closed position to an open position, at least one activity area comprising a drawing or partial drawing to be colored or completed.

* * * * *